Jan. 17, 1956  D. F. MAREAN  2,730,907
VARIABLE RATIO TRANSMISSION
Filed March 29, 1954  3 Sheets-Sheet 1

Inventor
Dale F. Marean
by Talbert Dick Adler
Attorneys

Witness
Edward P. Seeley

Jan. 17, 1956 D. F. MAREAN 2,730,907
VARIABLE RATIO TRANSMISSION
Filed March 29, 1954 3 Sheets-Sheet 2

Witness
Edward P. Seeley

Inventor
Dale F. Marean
by Talbert Dick & Adler
Attorneys

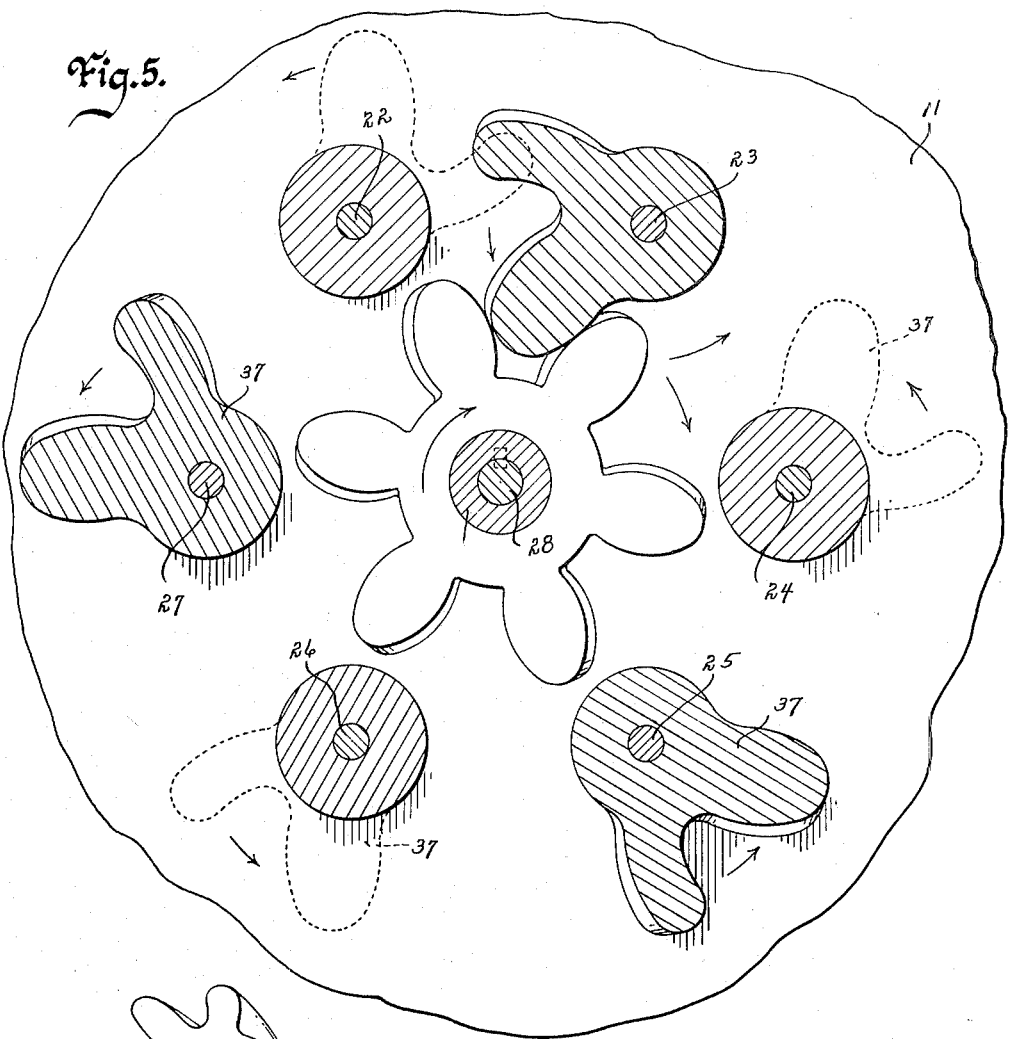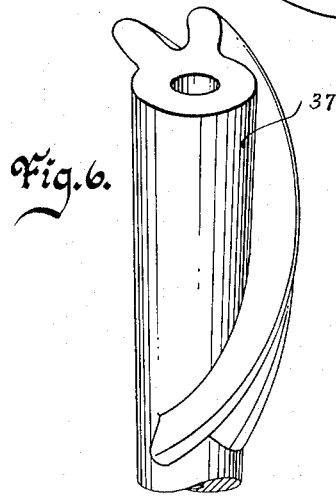

United States Patent Office 2,730,907
Patented Jan. 17, 1956

2,730,907

VARIABLE RATIO TRANSMISSION

Dale F. Marean, West Des Moines, Iowa

Application March 29, 1954, Serial No. 419,545

9 Claims. (Cl. 74—325)

This invention relates to gear ratio changing transmissions such as used on automotive vehicles, stationary machinery, moving equipment, and like.

The best known transmissions are those used on automobiles and trucks. Until recently, most such transmissions were of the "planetary gear type," having a manual shift control level. One objection to such transmissions was that a clutch means had to be imposed in the shaft train and this clutch had to be disengaged at the time of gear change. Thus, at least momentarily the driving shaft was disengaged from the driven shaft. Also the selection of gear ratios were positive and limited in number, usually only three forward gear ratios, i. e., low, intermediate and high. Furthermore, the transmissions were complicated, bulky, heavy and costly. More recently the automotive industry has turned to automatic transmissions. These newer transmissions are either limited to a specific number of gear ratios or else have no direct connection between the drive and driven shaft, and, therefore, undesirable slippage is experienced.

Therefore the principal object of my invention is to provide a variable transmission ratio that is always in gear before, during and after the change of ratio, thereby eliminating the actuation of any clutch means during the change from a lower to a higher gear, or from a higher to a lower gear.

A further object of my invention is to provide a transmission that has a progressive changeable gear ratio either from lower to higher gear or from higher to lower gear, thereby providing an infinite number of selectable gear ratios.

A still further object of this invention is to provide a variable ratio transmission that is adjustable by the movement of a single control lever movable in only two directions.

Still further objects of this invention are to provide a transmission that is light of weight, compact, and requires little installation space.

Still further objects of my invention are to provide a transmission that is durable in use and economical in manufacture.

These and other objects will be apparent to those skilled in the art.

Figure 1:
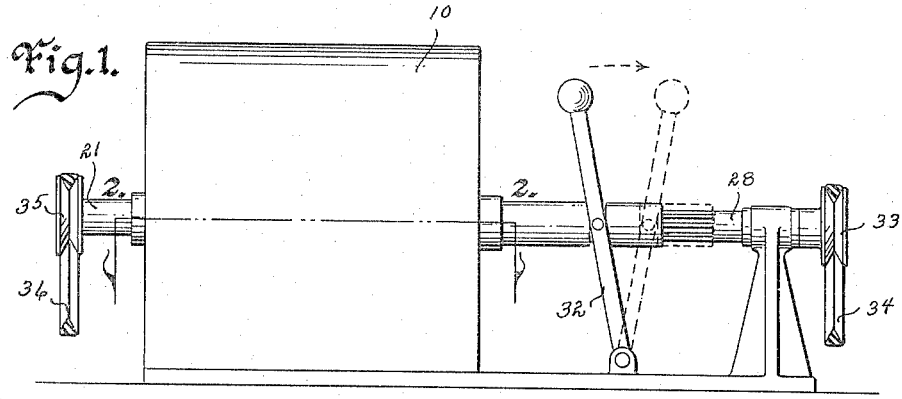
Figure 2:
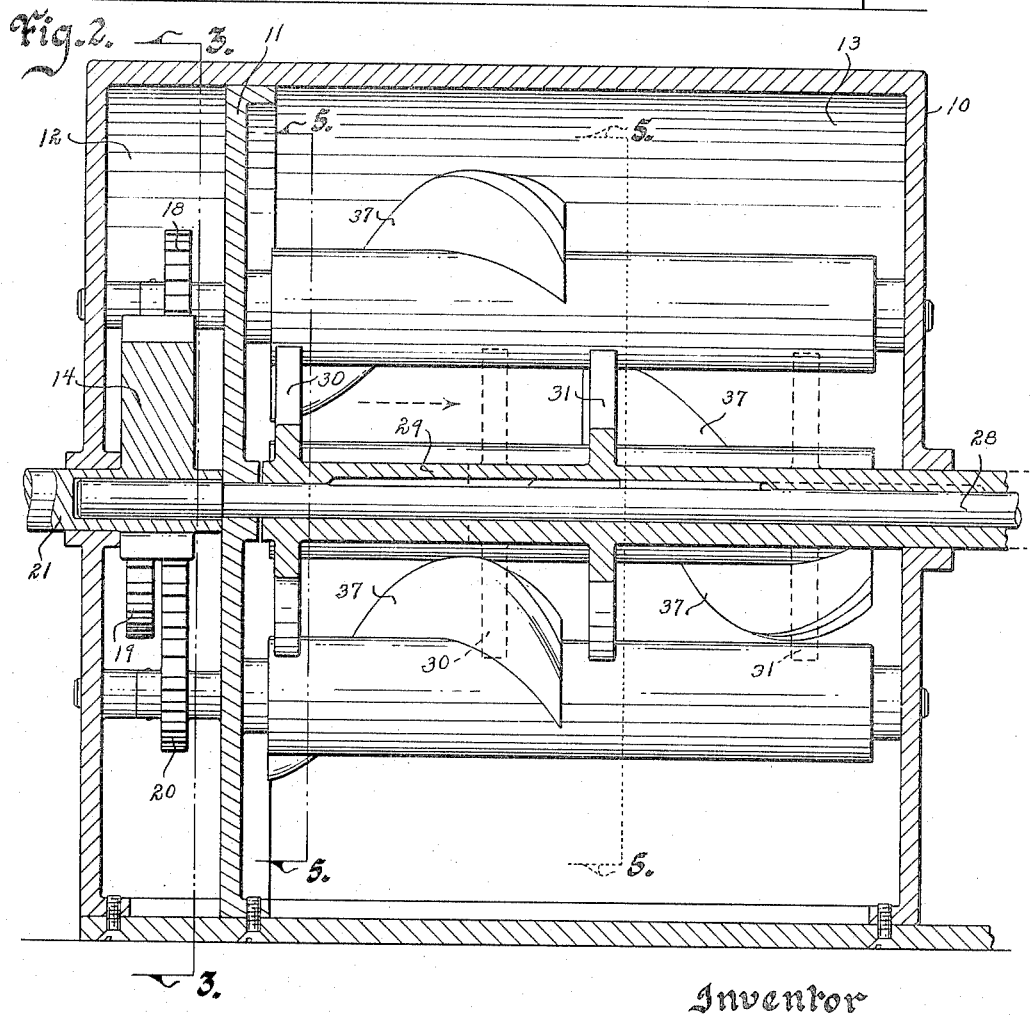
Figure 3:
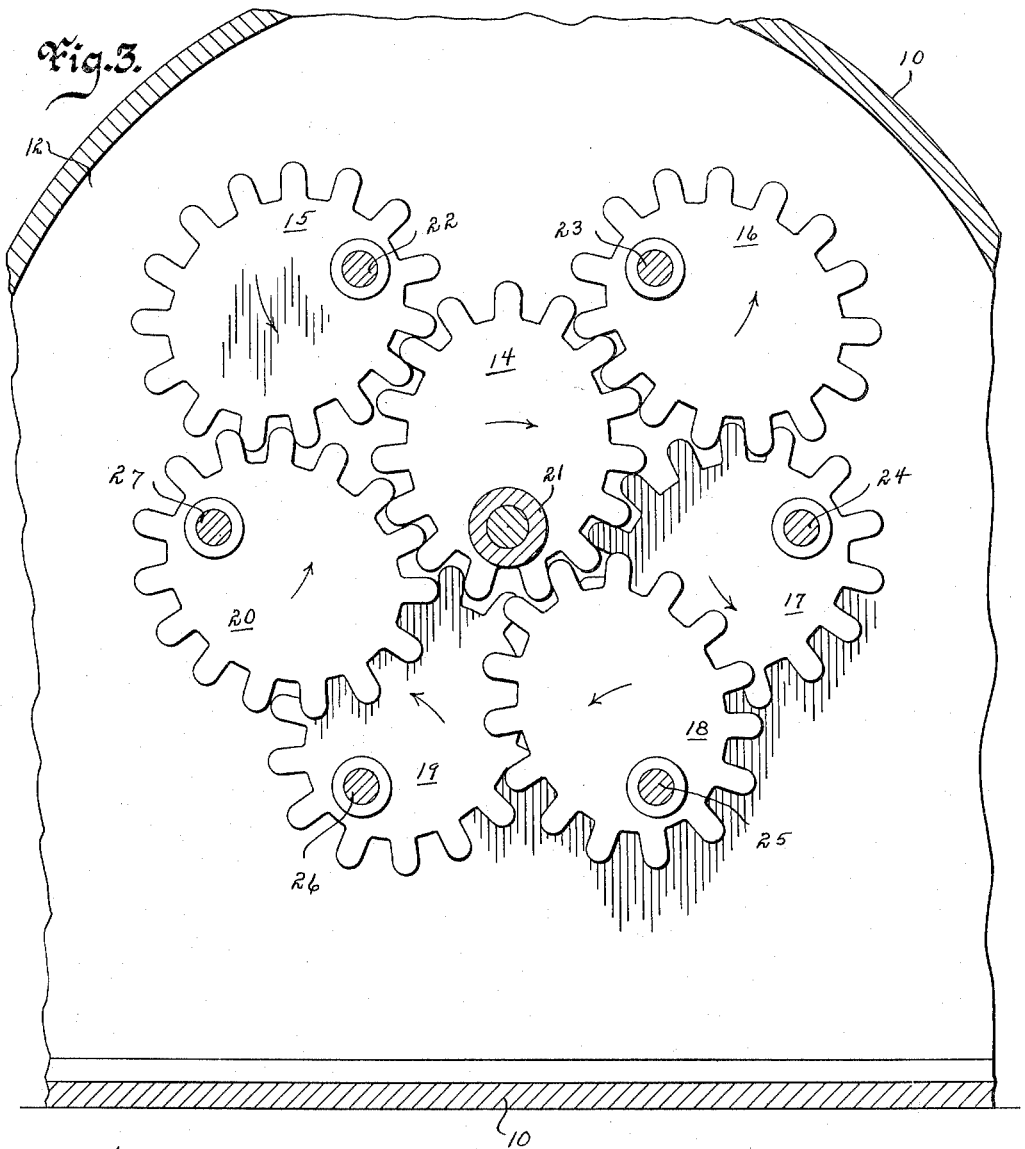
Figure 4:
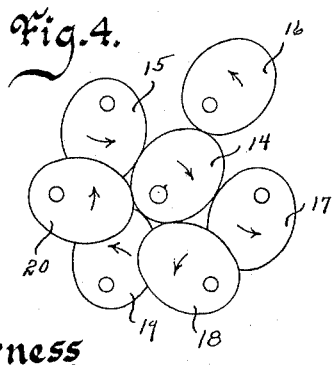

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of one form of my transmission in use,

Fig. 2 is a longitudinal sectional view of the device taken on line 2—2 of Fig. 1, Fig. 3 is an enlarged cross sectional view of my transmission taken on line 3—3 of Fig. 2, Fig. 4 is an illustrative view of the gears shown in Fig. 3, at a different position in their rotation, Fig. 5 is an enlarged composite cross sectional view taken from both lines 5—5 of Fig. 2, and Fig. 6 is a perspective view of one of the two teeth helical gears.

In these drawings I have used the numeral 10 to designate a housing with a partition 11 therein for dividing the housing into two compartments 12 and 13. To obtain my variable gear ratio, I take advantage of the fact that two eccentrically rotatably mounted meshed oval or elliptical gears will, when one is rotated at a given speed, rotate the other at varying speeds. While more or less elliptical toothed gears may be employed, I show one drive gear 14 and six driven gears 15, 16, 17, 18, 19 and 20 clustered around it as shown in Fig. 3. The drive gear 14 is mounted on a drive shaft 21 journaled in the left end of the housing 10, and extending into the compartment 12. All of the oval or elliptical gears 14, 15, 16, 17, 18, 19 and 20 are in the compartment 12, and the gear 14 is of a thickness more than double that of the other oval gears. The reason for this is that the gears must overlap each other at various times in their revolutions, as shown in Fig. 3 and Fig. 4.

Therefore, gears 16, 18 and 20 are closest to the partition 11, and the gears 15, 17 and 19 are closest to the left inside end of the housing 10 as shown in Fig. 2. These gears 15, 16, 17, 18, 19 and 20 are rigidly mounted on shafts 22, 23, 24, 25, 26 and 27 respectively. These shafts are evenly spaced apart and all are equally distant from the shaft 21. They are arranged in spaced relationship around the shaft 21, are parallel with each other and are journaled in both ends of the housing 10. Thus these shafts are rotatably mounted longitudinally in the transmission housing. It will be noted that all the oval gears are eccentrically mounted on their respective shafts near one of their small ends.

To make all these gears mesh, as the drive gear 14 rotates, it will have its small end opposite from its shafted end in engagement progressively with the shafted small end of all the other oval gears. In like manner, the free small end of each of the outer driven gears will, as they rotate progressively engage the teeth of the small shafted end of the driving gear 14. When the teeth along the sides of the drive gear are engaging the sides of a driven gear, the rotation of the shaft of the drive gear will be opposite to that of the rotation of the shaft of the driven gear. This ratio however changes as the teeth of one gear progress in the teeth of the other gear, and the direction of rotation will determine the increase or decrease of the ratio. Obviously, the free small end of the drive gear travels further than the travel of its shafted small end. Thus when the outer free small end engages the small shafted end of a driven gear, the latter will be relatively rapidly rotated and its shaft will momentarily speed up. This speed will progressively decrease until the outer free end of the driven gear engages the small shafted end of the drive gear, at which time the shaft of the driven gear will be rotating at a speed less than the speed of the shaft of the drive gear. By this arrangement of parts, the shafts 22, 23, 24, 25, 26 and 27 will be continuously progressively slowing up or speeding up in their rotation although the shaft 21 is being rotated at a constant speed. However, inasmuch as the shafts are spaced around the shaft 21, their speed up or slow down will be also progressive as to each other, and only one shaft at a time will reach the maximum ratio and only one shaft (its diametric opposite), will reach the minimum ratio at the same moment. Thus if the toothed gear 15 is progressively losing speed of rotation, gear 16 will be gaining speed rotation. Toothed gear 16 will then, after its maximum speed, lose speed while gear 17 picks up speed, and so on around the gear cluster.

The balance of the description of my device relates to means for selectively obtaining power from the shafts 22, 23, 24, 25, 26 and 27 at different moments in their rotation. Obviously, if power is derived from these shafts when they are turning slowly, a very low gear ratio would result, and if obtained when the shafts were turning faster than the shaft 21 was turning, a high gear ratio would be realized.

The numeral 28 designates a shaft journaled in the compartment 13 and concentric with the shaft 21. The numeral 29 designates a spool type spur gear having the two spaced apart spur gear portions 30 and 31 and longitudinally splined, keyed or like, to the shaft 28. The two spur gear portions 30 and 31 are inside the compartment 13. This spool type spur gear 28 may be manually slid forth and back inside the compartment 13 by any suitable means.

In the drawings I show a push-pulll straight lever 32. The shaft 28 is the outlet driven shaft and may be operatively connected to any desired rotary mechanism. In the drawings and for illustrative purposes, I show a pulley wheel 33 on the shaft driving a belt 34. A pulley wheel 35 is shown on the shaft 21 for receiving its power from a belt 36. Inside the compartment 13 and rigidly secured on each of the shafts 22, 23, 24, 25, 26 and 27 is a two toothed spiral or helical gear unit 37. The spiral teeth of every alternate gear unit is on its left end portion and the spiral teeth of the others are on their right end portions, so that they will not contact each other as they rotate. The teeth of the spur gear 30 engage the left end spiral gear teeth and the teeth of the spur gear 31 engage the right end spiral gear teeth. Obviously, the place in the longitudinal length of these spiral gear units that is engaged by the spool gear 29 will determine the speed of rotation of the spiral gear units, and therefore, the speed of the rotation of the driven shaft 28. Therefore, to vary the speed of rotation of the shaft 28, it is merely necessary to slide the spool gear to left or right.

In the drawings when the spool spur gear is to the extreme left of its sliding movement, the device will be in its highest gear ratio and when slid to its extreme right, will be in its lowest gear ratio. The complete sliding of the spool gear in either direction gives progressive, but positive gear change ratio from either low to high or from high to low. The device is always in gear. For changing gear ratios, it is merely necessary to move the hand lever either forwardly to increase the gear ratio, or rearwardly to reduce the gear ratio. The amount of lever movement will be in direct ratio to the amount of gear ratio change. The device will have no fixed number of gear ratios, but will be uniformly progressive in either direction. The limits of gear ratio will depend on the location of axis of the oval gears 14, 15, 16, 17, 18, 19 and 20.

While I show a straight throw lever 32 for sliding the spool gear 29, obviously the movement of this spool gear may be automatically actuated by suitable means.

If my device is to be used at extremely high speeds, counterbalance weights may be installed on the various gears and shafts. The spiral gears 37 serially engage the teeth of the spool 29 and therefore I limit the number of teeth on the spiral gears. I find at least two are necessary and in some instances, three teeth may be preferred.

Obviously, the rotation of the shafts 22, 23, 24, 25, 26 and 27 are never constant, even at the time the spiral gears are engaging the spool gear. Instead, they are speeding up or slowing down. Any suitable means may be employed to at least partially compensate for this speed variation. One method would be the changing of the pitch or shape, or size of the teeth of the spiral gears. I find that by making the leading tooth enlarged and with its trailing edge circling backwardly and inwardly as shown in Fig. 5, this variation is neutralized and the result will be a smooth operation.

Some changes may be made in the construction and arrangement of my variable ratio transmission without departing from the real spirit and purpose of my invention, and it is my intention to cover by my claims, any modified forms of structure or use of mechanical equivalents which may be reasonably included within their scope.

I claim:

1. In a transmission, a base, a drive shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a driven shaft rotatably mounted on said base, a toothed gear on said driven shaft, and a toothed unit on each of said plurality of shafts capable of engaging said toothed gear only at certain arcs of rotation of said plurality of shafts.

2. In a transmission, a base, a drive shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a driven shaft rotatably mounted on said base, a toothed gear on said driven shaft, a toothed unit on each of said plurality of shafts capable of engaging said toothed gear only at certain arcs of rotation of said plurality of shafts, and a means for changing the arcs of rotation of said plurality of shafts at which times said toothed units engage said toothed gear.

3. In a transmission, a base, a drive shaft rotatably mounted on said base, a toothed elliptical gear eccentrically mounted on said shaft, a plurality of shafts rotatably mounted on said base parallel to and arranged aound said first shaft in spaced relationship, a toothed elliptical gear ecentrically mounted on each of said plurality of shafts and in mesh with said first elliptical gear, a driven shaft rotatably mounted on said base, a toothed gear on said driven shaft, a toothed unit on each of said plurality of shafts capable of engaging said toothed gear only at certain arcs of rotation of said plurality of shafts, and a means for selectively changing the arcs of rotation of said plurality of shafts at which times said toothed units engage said toothed gear.

4. In a transmission, a base, a first shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a second shaft rotatably mounted on said base, a toothed gear on said second shaft, and a toothed unit on each of said plurality of shafts capable of engaging said toothed gear only at certain arcs of rotation of said plurality of shafts.

5. In a transmission, a base, a drive shaft rotatably mounted on said base, a toothed elliptical gear eccentrically mounted on said shaft, a plurality of shafts rotatably mounted on said base parallel to and arranged aound said first shaft in spaced relationship, a toothed elliptical gear eccentrically mounted on each of said plurality of shafts and in mesh with said first elliptical gear, a driven shaft rotatably mounted on said base, a toothed gear slidably keyed to said driven shaft, and a spiralled tooth helical gear on each of said plurality of shafts; whereby the relative sliding of said toothed gear on said second shaft will determine the arcs of rotation the spiraled tooth helical gears will be engaged by said slidably keyed toothed gear.

6. In a transmission, a base, a drive shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a driven shaft rotatably mounted on said base, a toothed gear slidably keyed to said driven shaft, a spiralled tooth helical gear on each of said plurality of shafts, and a means for sliding said toothed gear on said driven shaft; whereby the relative sliding of said toothed gear on said second shaft will determine the arcs of rotation the spiraled tooth helical gears will be engaged by said slidably keyed toothed gear.

7. In a transmission, a base, a drive shaft rotatably mounted on said base, a toothed elliptical gear eccentrically mounted on said shaft, a plurality of shafts rotatably mounted on said base parallel to and arranged around said first shaft in uniform spaced relationship; all of said shafts being even distance from said drive shaft, a toothed elliptical gear eccentrically mounted on each of said plurality of shafts and in mesh with said first elliptical gear, a driven shaft rotatably mounted on said base, a toothed gear on said driven shaft, and a toothed unit on each of said plurality of shafts capable of engaging said toothed gear only at certain arcs of rotation of said plurality of shafts.

8. In a transmission, a base, a drive shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a driven shaft rotatably mounted on said base, a toothed gear slidably keyed to said driven shaft, and a spiralled partially toothed helical gear on each of said plurality of shafts; whereby the relative sliding of said toothed gear on said second shaft will determine the arcs of rotation the spiraled tooth helical gears will be engaged by said slidably keyed toothed gear.

9. In a transmission, a base, a drive shaft rotatably mounted on said base, a toothed elliptical gear eccentrically mounted on said shaft, a plurality of shafts rotatably mounted on said base parallel to and arranged around said first shaft in spaced relationship, a toothed elliptical gear eccentrically mounted on each of said plurality of shafts and in mesh with said first elliptical gear, a driven shaft rotatably mounted on said base, a toothed gear slidably keyed to said driven shaft, and a spiralled partially toothed helical gear on each of said plurality of shafts; at least one of the teeth being of a different shape than the tooth next to it; whereby the relative sliding of said toothed gear on said second shaft will determine the arcs of rotation the spiraled tooth helical gears will be engaged by said slidably keyed toothed gear.

No references cited.